United States Patent
Matsuoka et al.

(10) Patent No.: US 8,529,824 B2
(45) Date of Patent: *Sep. 10, 2013

(54) METHOD FOR MANUFACTURING PRESSURE-RESISTANT CONTAINER LINER AND LIQUID CRYSTAL RESIN LINER

(75) Inventors: Seiichi Matsuoka, Tokyo (JP); Shigeru Nezu, Tokyo (JP); Akihide Shimoda, Fuji (JP); Masato Suzuki, Fuji (JP); Toshio Nakane, Fuji (JP)

(73) Assignees: Fuji Jukogo Kabushiki Kaisha, Tokyo (JP); Polyplastics Co., Ltd, Tokyo (JP)

( * ) Notice: Subject to any disclaimer, the term of this patent is extended or adjusted under 35 U.S.C. 154(b) by 1008 days.

This patent is subject to a terminal disclaimer.

(21) Appl. No.: 11/911,061

(22) PCT Filed: Mar. 31, 2006

(86) PCT No.: PCT/JP2006/306865
§ 371 (c)(1),
(2), (4) Date: Aug. 26, 2009

(87) PCT Pub. No.: WO2006/112252
PCT Pub. Date: Oct. 26, 2006

(65) Prior Publication Data
US 2010/0028584 A1    Feb. 4, 2010

(30) Foreign Application Priority Data
Apr. 14, 2005    (JP) .................... 2005-117095

(51) Int. Cl.
*B29C 49/04*    (2006.01)
(52) U.S. Cl.
USPC .......................... 264/540; 264/523

(58) Field of Classification Search
None
See application file for complete search history.

(56) References Cited

U.S. PATENT DOCUMENTS 5,306,461 A * 4/1994 Corallo et al. ............ 264/540
5,508,374 A   4/1996 Lee et al.
(Continued)

FOREIGN PATENT DOCUMENTS

| EP | 0 636 470 A1 | 2/1995 |
|----|--------------|--------|
| JP | 64-58523     | 3/1989 |

(Continued)

OTHER PUBLICATIONS

Supplemental European search report issued by the European Patent Office for the related application No. EP 06 73 0813, Aug. 2011.

(Continued)

*Primary Examiner* — Monica Huson
(74) *Attorney, Agent, or Firm* — Smith, Gambrell & Russell, LLP (57) ABSTRACT

A resin composition formed by mixing 99 to 70 weight % of specific whole aromatic polyesteramide liquid crystal resin (A) with 1 to 30 weight % of epoxy modified polyolefin-base resin (B) and by melting and kneading both of the resins, wherein the resin composition having a melt viscosity of 60 to 4000 Pa·s at a shear rate of 1000/second at a temperature which is 20° C. higher than the melting point and having a melt tension of 20 mN or more at a take-over speed of 14.8 m/minute, is melt within a temperature range of a melting point to the melting point +40° C., a parison (P) is formed by extruding it with an extrusion speed equal to or higher than 0.3 kg/minute and lower than 5 kg/minute, a pair of moldings placed so as to sandwich the parison (P) are closed at a predetermined mold closing pressure, and air is blown into the parison (P).

10 Claims, 3 Drawing Sheets

(56) References Cited

U.S. PATENT DOCUMENTS

| | | | |
|---|---|---|---|
| 5,891,532 A * | 4/1999 | Furuta et al. | 428/1.33 |
| 7,648,748 B2 * | 1/2010 | Nakane et al. | 428/36.8 |
| 7,776,410 B2 * | 8/2010 | Nakane et al. | 428/1.1 |
| 7,988,907 B2 * | 8/2011 | Matsuoka et al. | 264/540 |
| 2005/0260372 A1 | 11/2005 | Matsuoka et al. | |
| 2009/0022918 A1 | 1/2009 | Matsuoka et al. | |

FOREIGN PATENT DOCUMENTS

| | | |
|---|---|---|
| JP | 5-125160 | 5/1993 |
| JP | 6-91739 | 4/1994 |
| JP | 6-238738 | 8/1994 |
| JP | 6-306261 | 11/1994 |
| JP | 2000-351149 | 12/2000 |
| JP | 2005-7871 | 1/2005 |
| JP | 2005007871 A * | 1/2005 |

OTHER PUBLICATIONS

Extended European Search Report dated Mar. 8, 2011 by the European Patent Office for related application No. EP 06 73 0813.
U.S. Office Action dated Feb. 13, 2008 for U.S. Appl. No. 11/191,965, filed Jul. 29, 2005.
U.S. Office Action dated Jul. 9, 2008 for U.S. Appl. No. 11/191,965, filed Jul. 29, 2005.
U.S. Office Action dated Jul. 9, 2009 for U.S. Appl. No. 12/223,326, filed Jul. 29, 2008.
U.S. Office Action dated Feb. 4, 2010 for U.S. Appl. No. 12/223,326, filed Jul. 29, 2008.
U.S. Office Action dated Jun. 24, 2010 for U.S. Appl. No. 12/223,326, filed Jul. 29, 2008.
U.S. Office Action dated Feb. 4, 2011 for U.S. Appl. No. 12/223,326, filed Jul. 29, 2008.

* cited by examiner

DEEP DRAWING PROCESSING

WELDING OF THE OTHER END

FIG.4

EXTRUSION → MOLD CLOSING → BLOWING

METHOD FOR MANUFACTURING PRESSURE-RESISTANT CONTAINER LINER AND LIQUID CRYSTAL RESIN LINER

TECHNICAL FIELD

The present invention relates to a method for manufacturing a pressure-resistant container liner and a liquid crystal resin liner.

BACKGROUND ART

Currently, a pressure-resistant container for storing and transporting pressurized gas, e.g., Compressed Natural Gas (CNG), Compressed Hydrogen Gas (CHG) or low-temperature gas has been put into practical use. Conventionally, a metal pressure-resistant container having a high strength and a superior gas barrier property has been mainly used. However, because the metal pressure-resistant container has a heavy weight, it was difficult to apply the container to a fuel tank of an automobile and that of a spacecraft, which are required to have lighter weight. Thus, a pressure-resistant container having a relatively light weight, which is formed by surrounding the outer circumference of a cylindrical liner with an outer shell made of fiber reinforced resin composite has been suggested in recent years.

Figure 3:
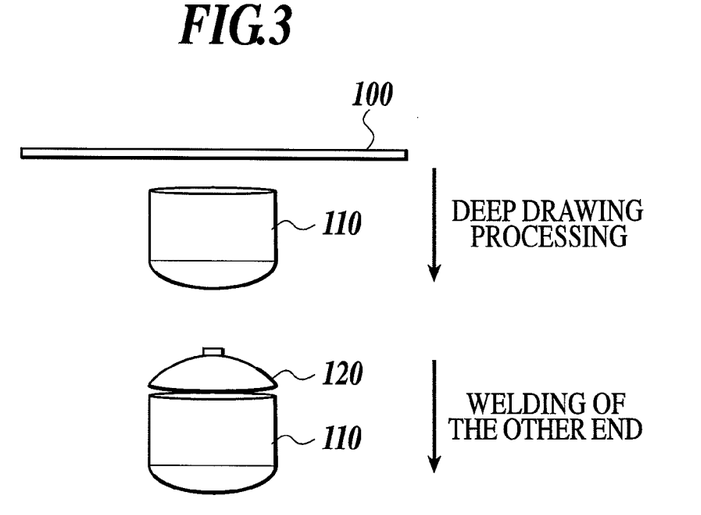
FIG. 3 This is an explanation view for explaining a conventional method for manufacturing a metal liner.

As a liner constituting such a pressure-resistant container, a metal liner having a superior gas barrier property has been suggested. As shown in FIG. 3, a metal liner is generally manufactured by carrying out a deep drawing processing for a metal plate 100 to form a container 110 and by welding a dome section 120 manufactured by another step with the opening section of this container 110.

The metal liner manufactured through the above step itself has a load resistance property having a certain level. Thus, it is possible to suppress the manufacturing cost by reducing the thickness of the composite outer shell. However, the liner is not expected to be significantly lightened. On the other hand, another technique for forming a very thin liner by performing a chemical etching for a metal liner manufactured through the above step, has been suggested. Although a liner can be expected to be significantly lightened, there was a problem that the manufacturing cost was increased.

Figure 4:
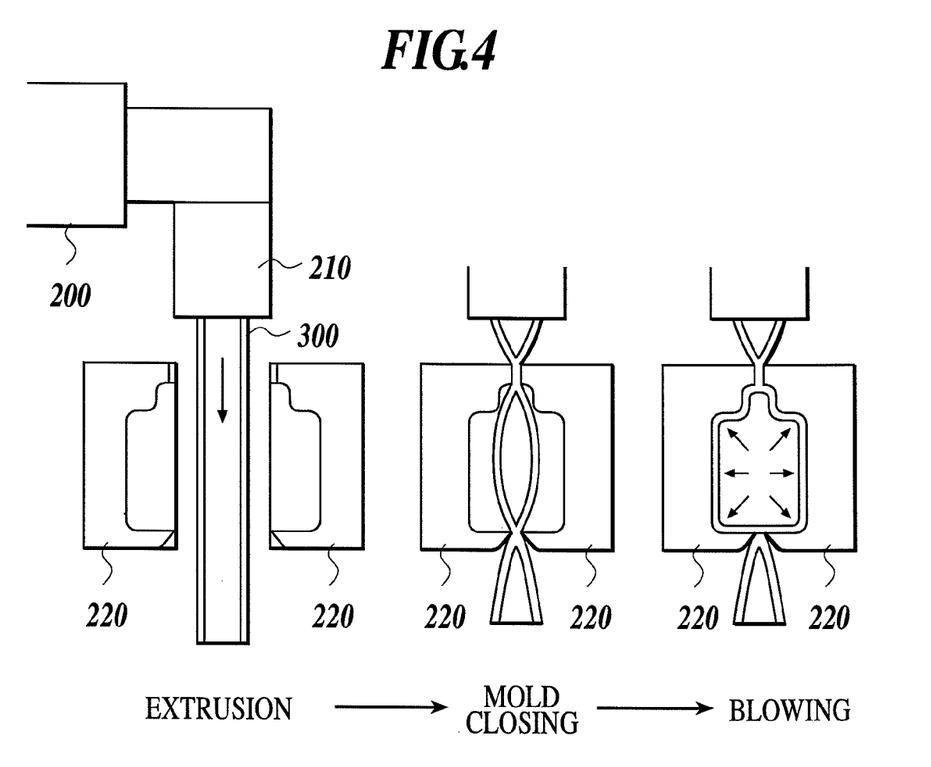
FIG. 4 This is an explanation view for explaining a conventional method for manufacturing a resin liner by a blow molding.

In order to solve the problem of the metal liner, a technique for manufacturing a liner by carrying out a blow molding for thermoplastic resin, has been suggested. As shown in FIG. 4, the blow molding is that melted thermoplastic resin is extruded by an extruder 200 through a circular gap of a dice 210 to form a parison 300 (extrusion step), the parison 300 is placed between a pair of molds 220 to close the molds 220 (mold closing step), and gas is blown into the parison 300 in the closed molds to form the liner (blowing step). By adopting this blow molding, it is possible to significantly reduce time required for processing the liner and the manufacturing cost.

By the way, a liner constituting a pressure-resistant container must have a "gas barrier property". Thus, in the liner, it is required to use thermoplastic resin having a superior gas barrier property. In recent years, "liquid crystal resin" has been suggested as thermoplastic resin having a superior gas barrier property. When liquid crystal resin is compared with thermoplastic resin (high density polyethylene) which has been currently used as material for a liner for a high pressure tank, liquid crystal resin has a gas barrier property about 400000 times or more higher than that of thermoplastic resin. A current high pressure tank using a high density polyethylene liner can be practically used under conditions of a CNG200 atm. However, while it is assumed that a tank pressure will increase in the future (e.g., 700 atm) or that hydrogen or helium having a small molar weight is used as storage gas, a technique for adapting liquid crystal resin to a liner has been developed (see, Patent Publication 1 for example).

Patent Publication 1: Japanese Laid-Open Publication No. H6-238738 (page 3, FIG. 1)

DISCLOSURE OF THE INVENTION

Problem to be Solved by the Invention

However, in the liquid crystal resin, there is a problem that a tensile breaking elongation is lower than those of other thermoplastic resins. For example, while high density polyethylene which is currently used for a liner has a tensile breaking elongation of 500%, general liquid crystal resin has a tensile breaking elongation of about 2%. Thus, in order to adapt liquid crystal resin to a liner, the improvement of the tensile breaking elongation has been essential.

When a liner is formed by a blow molding in which the liquid crystal resin is used as a material, there is a problem that the liquid crystal resin has a high "anisotropic nature". The "anisotropic nature" means a nature in which the properties of the material are different depending on directions. Thus, when the anisotropic nature is high, the material is easily broken in a direction in which a poor property is caused. A composite used for an outer package of a pressure-resistant container is generally required to have a tensile breaking elongation of about 1.5% to 2%, when carbon fibers are used as reinforced fibers. Therefore, the liner is required to have a tensile breaking elongation of "2%" at minimum. Further, a design margin in which the liner is prevented from being broken prior to the breakage of the composite, is required. Thus, a tensile breaking elongation of "3% or more" is preferably achieved in all directions in consideration with the anisotropic nature.

Furthermore, because the liquid crystal resin has a poor adhesiveness, when a blow molding is carried out by using the liquid crystal resin, a pinch-off section functioning as an adhesive region tends to have a defect. The existence of the defect appears as the decrease of a tensile breaking elongation of the pinch-off section. The pinch-off section is generally near the top of a dome section of a pressure-resistant container. In the part which is near the top of the dome section, when a composite is wound by a Filament Winding (FW) method to form an outer shell, the outer shell is thicker than the other parts. Thus, the amount of the occurring elongation can be smaller than those of other parts and can be suppressed to about 1% or less according to the analysis. Thus, in the pinch-off section of the liner, a tensile breaking elongation of "1% or more" is required and a tensile breaking elongation of "2% or more" is preferably achieved in consideration of the design margin.

In Patent Publication 1 described above, a technique for adding specific filling material e.g., glass fiber, mineral filling material or the like, to give a blow molding property to the liquid crystal resin, is described. When liquid crystal resin is used to form a liner, it is required that the decrease of the tensile breaking elongation of the pinch-off section (adhesive region) is prevented as described above. However, no technique that can solve the decrease of the tensile breaking elongation of the pinch-off section has been suggested.

An object of the present invention is to provide a method for manufacturing a pressure-resistant container liner, in which a liquid crystal resin pressure-resistant container liner having a superior gas barrier property can be provided in a blow molding by improving the "tensile breaking elongation"

of the liquid crystal resin and by improving the "anisotropic nature" to give the liquid crystal resin with a favorable blow molding property.

An object of the present invention is to provide a liquid crystal resin liner manufactured by the above manufacturing method.

Means for Solving the Problem

In order to solve the above problem, the invention as claimed in claim 1 is a method for manufacturing a pressure-resistant container liner by a blow molding, comprising: a resin composition melting step of mixing 99 to 70 weight % of specific whole aromatic polyesteramide liquid crystal resin (A), the whole aromatic polyesteramide liquid crystal resin comprising repeating polymerization units of: (I) 1 to 15 mol % of 6-hydroxy-2-naphthoic acid residue, (II) 40 to 70 mol % of 4-hydroxy benzoic acid residue, (III) 5 to 28.5 mol % of aromatic diol residue, (IV) 1 to 20 mol % of 4-aminophenol residue, and (V) 6 to 29.5 mol % of aromatic dicarboxylic acid residue, with 1 to 30 weight % of epoxy modified polyolefin-base resin (B) (a total of the whole aromatic polyesteramide liquid crystal resin and epoxy modified polyolefin-base resin is 100 weight %) to form a resin composition by melting and kneading the whole aromatic polyesteramide liquid crystal resin and epoxy modified polyolefin-base resin, and of heating and melting the resin composition within a temperature range of a melting point to the melting point +40° C., the resin composition having a melt viscosity of 60 to 4000 Pa·s at a shear rate of 1000/second at a temperature which is 20° C. higher than the melting point and having a melt tension of 20 mN or more at a take-over speed of 14.8 m/minute; a parison forming step of extruding and forming a cylindrical parison with an extrusion speed equal to or higher than 0.3 kg/minute and lower than 5 kg/minute by using the specific resin composition melt in the resin composition melting step; a mold closing step of placing the parison formed in the parison forming step between a pair of molds forming a cylindrical cavity and of closing the molds; and a forming step of blowing gas into the parison in the molds closed in the mold closing step to form a liner.

The invention as claimed in claim 2 is a method for manufacturing a pressure-resistant container liner by a blow molding, comprising: a resin composition melting step of mixing 99 to 70 weight % of specific whole aromatic polyesteramide liquid crystal resin (A), the whole aromatic polyesteramide liquid crystal resin comprising repeating polymerization units of: (I) 1 to 15 mol % of 6-hydroxy-2-naphthoic acid residue, (II) 40 to 70 mol % of 4-hydroxy benzoic acid residue, (III) 5 to 28.5 mol % of aromatic diol residue, (IV) 1 to 20 mol % of 4-aminophenol residue, and (V) 6 to 29.5 mol % of aromatic dicarboxylic acid residue, with 1 to 30 weight % of epoxy modified polyolefin-base resin (B) (a total of the whole aromatic polyesteramide liquid crystal resin and epoxy modified polyolefin-base resin is 100 weight %) to form a resin composition by melting and kneading the whole aromatic polyesteramide liquid crystal resin and epoxy modified polyolefin-base resin, and of heating and melting the resin composition within a temperature range of a melting point to the melting point +40° C., the resin composition having a melt viscosity of 60 to 4000 Pa·s at a shear rate of 1000/second at a temperature which is 20° C. higher than the melting point and having a melt tension of 20 mN or more at a take-over speed of 14.8 m/minute; a parison forming step of extruding and forming a cylindrical parison with a shear rate equal to or higher than 50/second and lower than 1000/second by using the specific resin composition melt in the resin composition melting step; a mold closing step of placing the parison formed in the parison forming step between a pair of molds forming a cylindrical cavity and of closing the molds; and a forming step of blowing gas into the parison in the molds closed in the mold closing step to form a liner.

According to the invention as claimed in claim 1 or claim 2, the whole aromatic polyestermide liquid crystal resin composition having a specific composition is mixed with the epoxy modified polyolefin-base resin to generate a liquid crystal resin composition having a specific melt property by melting and kneading them. The liquid crystal resin composition is heated and melted at a specific temperature and a cylindrical parison is extruded at a specific extrusion speed or a shear rate to perform a blow molding. Thus, in a trunk section of the liner, it can be achieved that a tensile breaking elongation is "2% or more" in all directions in consideration with the anisotropic nature and in a pinch-off section of the liner, it can be achieved that a tensile breaking elongation is "1% or more". Furthermore, by using the property of the liquid crystal resin, a liner having a superior gas barrier property can be obtained.

The invention as claimed in claim 3 is characterized in that in the method for manufacturing a pressure-resistant container liner as claimed in claim 1 or 2, a resin composition in which an increase rate of a melt tension (which is called as a melt tension increase rate) at a twice take-over speed (29.6 m/minute) to the melt tension at the take-over speed of 14.8 m/minute is 1.05 or more, is used.

According to the invention as claimed in claim 3, the liner has an appropriate increase rate of the melt tension at a twice take-over speed (29.6 m/minute) to the melt tension at a take-over speed of 14.8 m/minute. Because a blow molding is easily carried out, a high-quality liner can be manufactured with a high yield.

The invention as claimed in claim 4 is characterized in that in the method for manufacturing a pressure-resistant container liner as claimed in any of claims 1 to 3, when the mold closing step is performed, a value obtained by dividing a mold closing pressure by a thickness of a pinch-off section is of 3.5 MPa/cm or more.

According to the invention as claimed in claim 4, when the mold closing step is performed, a value obtained by dividing the mold closing pressure by the thickness of the pinch-off section is a specific threshold value (3.5 MPa/cm) or more. Thus, the adhesiveness of the liquid crystal resin in the pinch-off section of the liner is increased. The tensile breaking elongation of the pinch-off section can be improved.

The invention as claimed in claim 5 is characterized in that in the method for manufacturing a pressure-resistant container liner as claimed in any of claims 1 to 4, two-stage pinch sections are provided in the molds and a space is formed between the two-stage pinch sections when the molds are closed in the mold closing step.

According to the invention as claimed in claim 5, two-stage pinch sections are provided in the molds and a space is formed between the two-stage pinch sections when the molds are closed in the mold closing step. Thus, when the parison is cut off in the mold closing step, the liquid crystal resin can be stored in the space formed between the two-stage pinch sections. Therefore, when the mold closing is carried out, it can be prevented that the liquid crystal resin flows out of the pinch-off section of the liner to the outside of the mold. It can be prevented that the pinch-off section of the liner is thinner. As a result, it is possible to increase the adhesiveness of the pinch-off section and to improve the tensile breaking elongation of the pinch-off section.

The invention as claimed in claim 6 is a liquid crystal resin liner manufactured by the method for manufacturing the pressure-resistant container liner as claimed in any one of claims 1 to 5, wherein a tensile breaking elongation in all directions of a trunk section is 2% or more and a tensile breaking elongation in a pinch-off section is 1% or more.

According to the invention as claimed in claim 6, in the liquid crystal resin liner, the tensile breaking elongation in all directions of the trunk section is "2% or more" and the tensile breaking elongation in the pinch-off section is "1% or more". Thus, it is possible to satisfy the properties required for the trunk section and the pinch-off section of the pressure-resistant container liner. Furthermore, because of the property of the liquid crystal resin, the liquid crystal resin liner according to the present invention can have a superior gas barrier property. Thus, the liquid crystal resin liner can be suitably used as a pressure-resistant container liner instead of a high density polyethylene liner.

The invention as claimed in claim 7 is characterized in that in the liquid crystal resin liner as claimed in claim 6, the pinch-off section has a thickness of 2 mm or more.

According to the invention as claimed in claim 7, in the liquid crystal resin liner, the pinch-off section has a thickness of the specific threshold value (2 mm) or more. Thus, the adhesiveness of the pinch-off section is increased and the liner has a high tensile breaking elongation.

Effect of the Invention

According to the present invention, the whole aromatic polyestermide liquid crystal resin composition having a specific composition is mixed with the epoxy modified polyolefin-base resin to generate a liquid crystal resin composition having a specific melt property by melting and kneading them. The liquid crystal resin composition is heated and melted at a specific temperature and a cylindrical parison is extruded at a specific extrusion speed or a shear rate to perform a blow molding. Thus, it is possible to increase the "tensile breaking elongation" of a blow-molded product (pressure-resistant container liner) and to improve the "anisotropic nature". As a result, the pressure-resistant container liner which effectively uses a superior gas barrier property of the liquid crystal resin can be obtained.

BEST MODE FOR CARRYING OUT THE INVENTION

Hereinafter, an embodiment of the present invention will be described in detail with reference to the drawings.

First, a liquid crystal resin composition that is used for a manufacture method according to an embodiment of the present invention will be described.

<Configuration and Property of Liquid Crystal Resin Composition According to the Present Invention>

In the present invention, a resin composition is provided by mixing 99 to 70 weight % of whole aromatic polyesteramide liquid crystal resin (A) composed of the following repeating polymerization units (I) to (V) with 1 to 30 weight % of epoxy modified polyolefin-base resin (B) (the total of both of the resins is 100 weight %) and by melting and kneading the both of the resins. The resin composition has a melt viscosity of 60 to 4000 Pa·s at a shear rate of 1000/second at a temperature 20° C. higher than the melting point (which is called as temperature T1) and has a melt tension of 20 mN or more at a take-over speed of 14.8 m/minute.

(I) 6-hydroxy-2-naphthoic acid residue: 1 to 15 mol %
(II) 4-hydroxy benzoic acid residue: 40 to 70 mol %
(III) Aromatic diol residue: 5 to 28.5 mol %
(IV) 4-aminophenol residue: 1 to 20 mol %
(V) Aromatic dicarboxylic acid residue: 6 to 29.5 mol %

The total of the repeating polymerization units (I) to (V) of the above-described whole aromatic polyesteramide liquid crystal resin (A) is 100 mol %. It is noted that the term "liquid crystal resin" in the present invention shows an optical anisotropic nature during the melting. The nature in which an anisotropic nature is shown during the melting can be checked by a general polarization inspection method using an orthogonal polarizer. By the liquid crystal resin, superior properties such as very low gas permeation property (very high gas barrier property), dimensional stability, chemical resistance and the like, can be realized.

(I) 6-hydroxy-2-naphthoic acid residue is mixed at a ratio of 1 to 15 mol % and is particularly preferably mixed at a ratio of 2.0 to 10 mol %. (II) 4-hydroxy benzoic acid residue is mixed at a ratio of 40 to 70 mol % and is particularly preferably mixed at a ratio of 50 to 65 mol %. (III) Aromatic diol residue is mixed at a ratio of 5 to 28.5 mol % and is preferably mixed at a ratio of 5 to 25 mol % and is more preferably mixed at a ratio of 10 to 20 mol %. (IV) 4-aminophenol residue is mixed at a ratio of 1 to 20 mol % and is preferably mixed at a ratio of 2 to 15 mol % and is more preferably mixed at a ratio of 10 to 2.5 to 10 mol %. (V) aromatic dicarboxylic acid residue is mixed at a ratio of 6 to 29.5 mol % and is preferably mixed at a ratio of 8 to 25 mol % and is more preferably mixed at a ratio of 10 to 20 mol %.

(III) Aromatic diol residue and (V) aromatic dicarboxylic acid residue are a divalent group including at least one aromatic ring and may be structured so that two or more aromatic rings are bound by a methylene group, an ethylene group, an isopropylidene group, a hexafluoroisopropylidene group, a carbonyl group, sulfur atom, a sulfone group, a sulfoxide group, an oxygen atom, or an alkylenedioxy group (e.g., carbon number 2 to 6). Preferably, the residues are one or two or more types selected from a 1,4-phenylene group, a 1,3-phenylene group, a 2,6-naphthalene group, and a 4,4'-biphenylene group.

Polyesteramide liquid crystal resin obtained by partially introducing amide binding in a polyester skeleton including hydroxy benzoic acid residue as a main component has a high tensile breaking elongation and is preferable for obtaining a blow-molded product. However, when the amide bindings excessively exist, the hue is deteriorated and the thermal stability is decreased. Thus, it is required that the amide binding is limited to a range of 20 mol % or less of all bind units. By using the liquid crystal resin of the whole aromatic polyesteramide liquid crystal resin according to the present invention, it is possible to obtain a favorable blow-molded product.

In order to generate the above repeating polymerization units (I) to (V) specifically, general esters or various raw material compounds having amide forming ability can be used as raw material compounds. Raw material compound required for forming liquid crystal polyesteramide according to the present invention may be 6-hydroxy-2-naphthoic acid, 4-hydroxy benzoic acid, aromatic diol, 4-aminophenol, aromatic dicarboxylic acid without any modification or also may be material obtained by modifying various functional groups with various derivatives depending on the necessity in polycondensation reaction. For example, ester or amide thereof, specifically, acetyl compound such as 4-(N-acetylamino)phenol, may be used.

The whole aromatic polyesteramide liquid crystal resin (A) according to the present invention can be obtained by polymerization using direct polymerization or ester exchange. In the polymerization, solvent polymerization, melt polymerization, slurry polymerization or the like is generally used. In these polymerization methods, various catalysts can be used. As typical examples, dialkyl tin oxide, diaryl tin oxide, titanium dioxide, alkoxytitanium silicates, titanium alcoholates, alkali and alkaline earth metal salts of carboxylic acid, or Lewis acid such as boron trifluoride or the like are included. The amount of catalyst to be used is preferably 0.001 to 1 weight % of the total weight of monomers.

The above whole aromatic polyesteramide liquid crystal resin (A) preferably has a melting point of 270 to 370° C. by DSC and has a melt viscosity of 20 to 60 Pa·s at a shear rate of 1000/second at a temperature 20° C. higher than the melting point (temperature T1).

In case that the liquid crystal resin has a melting point lower than 270° C., the resin composition has a low mechanical property. Therefore, the use of the resin composition in the field in which a high strength of a single layer is required is limited. When the melting point thereof exceeds 370° C., side reaction, such as decomposition caused by high temperature at which the liquid crystal resin is melt and kneaded with the epoxy modified polyolefin-base resin (B), cannot be suppressed. Therefore, there is some possibility that the liquid crystal resin composition having a sufficient quality cannot be obtained.

When the melt viscosity at a shear rate 1000/second at a temperature T1 is not in the above range, the dispersion of the epoxy modified polyolefin-base resin (B) is poor and the drawdown resistance property and the uniform thickness property is insufficiently improved during the forming, such as the blow molding. As a result, there is some possibility that the mechanical property and the low gas permeation property of a molded product are badly affected.

The above-described epoxy modified polyolefin-base copolymer (B) is a copolymer including α-olefins and α,β-unsaturated acid glycidyl ester as a main component.

As the above α-olefins, ethylene, copolymer consisting of ethylene and α-olefin having a carbon number of 3 or more, and ternary copolymer consisting of ethylene, α-olefin having a carbon number of 3 or more, and nonconjugated diene and the like are exemplified. Ethylene is preferably used as the above α-olefins.

As the α-olefin having a carbon number of 3 or more, propylene, butane-1, pentene-1,3-methylpentene-1, octacene-1 and the like are exemplified. Among them, propylene and butane are preferably used. As nonconjugated diene, norbornene compounds, such as 5-methyliden-2-norbornene, 5-ethylidene-2-norbornene, 5-vinyl-2-norbornene, 5-propenyl-2-norbornene, 5-isopropenyl-2-norbornene, 5-crotyl-2-norbornene, 5-(2-methyl-2-butenyl)-2-norbornene, 5-(2-ethyl-2-butenyl)-2-norbornene, 5-methacrylic norbornene, 5-methyl-5-vinyl norbornene or the like, dichloropentadiene, methyltetrahydroindene, 4,7,8,9-tetrahydroindene, 1,5-cyclooctadiene, 1,4-hexadiene, isoprene, 6-methyl-1,5-heptadiene, and 11-ethyl-1,1,1-tridecadiene are exemplified. Preferably, 5-methyliden-2-norbornene, 5-ethylidene-2-norbornene, dichloropentadiene, 1,4-hexadiene or the like can be used.

As the above α,β-unsaturated acid glycidyl ester, specifically, glycidyl acrylate ester, glycidyl methacrylate ester, glycidyl ethacrylate ester or the like are exemplified. However, glycidyl methacrylate is preferably used. Copolymer between α-olefin (e.g., ethylene) and α,β-unsaturated acid glycidyl ester can be generally obtained by a well-known radical polymerization reaction.

The suitable epoxy modified polyolefin-base copolymer (B) is obtained by copolymerization between 99 to 50 mol % of α-olefins and 1 to 50 mol % of α,β-unsaturated acid glycidyl ester. During the copolymerization of the epoxy modified polyolefin-base copolymer (B), copolymerizable unsaturated monomer, for example, vinylethers; vinylesters, such as, vinyl acetate, vinyl propionate; esters, such as methyl-, ethyl-, propyl-acrylate, and other (meta)acrylate; acrylonitrile; styrene or the like may be copolymerized when the additive amount thereof is 40 mol % or less.

Further, the graft polymerization can be carried out for the epoxy modified polyolefin-base copolymer (B) by using polymer or copolymer as a branched-chain or a cross-linking chain. As polymer or copolymer which is used as a branched-chain or a cross-linking chain to carry out the graft polymerization, the polymer or the copolymer obtained by carrying out polymerization or copolymerization for one or two or more selected from acrylic acid, methacrylic acid, methyl acrylate, methyl methacrylate, butyl acrylate, butyl methacrylate, acrylonitrile, and styrene can be exemplified. From the viewpoint of moldability, methacrylate polymer, copolymer of acrylonitrile and styrene, copolymer of methmethyl acrylate and butyl acrylate or the like are preferably exemplified. Copolymer of methyl methacrylate and butyl acrylate is particularly preferably exemplified. These polymers or copolymers are generally prepared by a known radical polymerization.

The branching reaction or the cross-linking reaction of these polymers or these copolymers also can be easily performed by radical reaction. For example, in the polymers or the copolymers, free radicals are generated by peroxide or the like. By melting and kneading α-olefin and α,β-unsaturated acid glycidyl ester copolymer the desired epoxy modified olefin-base copolymer (B) is prepared. A branched-chain or the cross-linking chain is preferably carried out so that 10 to 100 weight parts thereof are branched or cross-linked with regards to 100 weight parts of α-olefin and α,β-unsaturated acid glycidyl ester copolymer.

The resin composition according to the present invention comprises: 99 to 70 weight % of whole aromatic polyesteramide liquid crystal resin (A) or preferably 95 to 80 weight % thereof; and 1 to 30 weight % of the epoxy modified polyolefin-base resin (B) or preferably 5 to 20 weight % thereof.

When the components (B) are mixed in an amount lower than the above range, the increase of the melt viscosity and the melt tension of the resin composition is insufficient. When the components (B) are mixed in an amount more than the above range, the uniform thickness property of the molded product is decreased.

The resin composition of the present invention is obtained by melting and kneading the whole aromatic polyesteramide liquid crystal resin (A) and the epoxy modified polyolefin-base resin (B). The resin composition of the present invention has a melt viscosity of 60 to 4000 Pa·s, preferably a melt viscosity of 80 to 1000 Pa·s at the shear rate 1000/second at the temperature T1, and has a melt tension of 20 mN or more, preferably a melt tension of 50 to 200 mN at a take-over speed 14.8 mm/minute.

When the melt viscosity and the melt tension are lower than the above range, the drawdown resistance property is insufficient. When the melt viscosity and the melt tension are more than the above range, the stretchability or the uniform thickness property are deteriorated and the composition is not suitable for a blow molding.

The increase rate of the melt tension at 29.6 mm/minute that is a twice take-over speed to the melt tension at the take-over speed of 14.8 mm/minute is 1.05 or more, preferably 1.1 to 2.0.

When the increase rate of the melt tension is out of the above range, it is difficult to carry out the blow molding.

In the present invention, depending on the intended use, one or two or more well known fibrous, particulate, or plate-like inorganic and organic fillers can be mixed in liquid crystal resin prior to a specific heat treatment or after a specific heat treatment. When these fillers can be used, bundling agent or surface preparation agent can be used if necessary. The mixing amount of the filler is 1 to 80 weight %, preferably 2 to 30 weight % in the total amount of the composition.

Other thermoplastic resins may be supplementarily added to the composition of the whole aromatic polyesteramide liquid crystal resin according to the present invention within a scope in which the object of the present invention is not deteriorated. A well-known additive, such as antioxidant, lubricant, fire retardant or the like, which is generally used for thermoplastic resin also can be added to the composition depending on the intended use.

Next, with reference to FIG. 1 and FIG. 2, an example of the structure of a blow molding machine and the like, which is used for the manufacturing method according to an embodiment of the present invention will be described.

Figure 1:
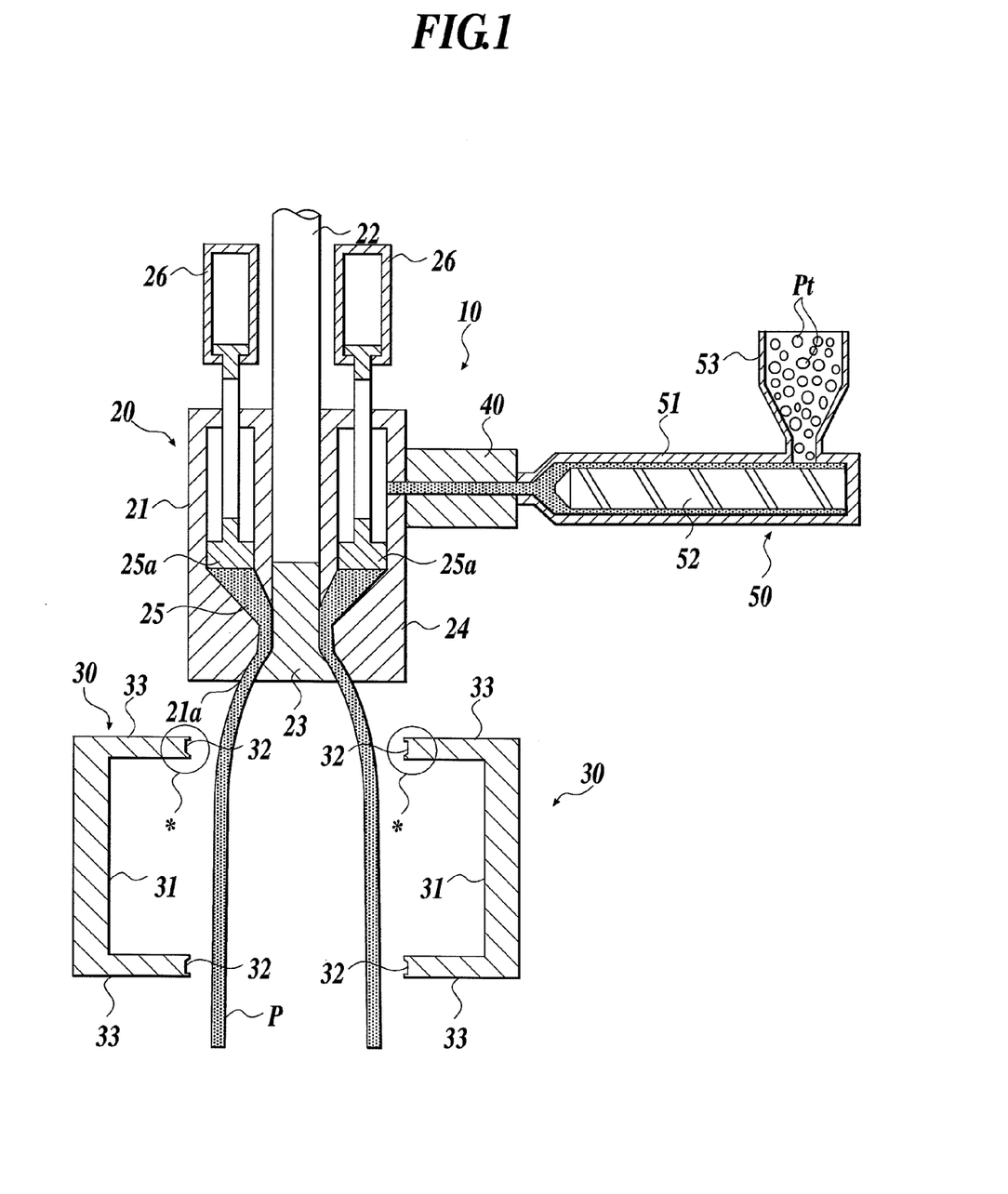
FIG. 1 This is an explanation view for explaining the structure of a blow molding machine and the like, which are used for a manufacturing method according to an embodiment of the present invention.

As shown in FIG. 1, a blow molding machine 10 comprises an accumulator head 20 for extruding the liquid crystal resin which is introduced in the heated and melt state through a circular gap to form a cylindrical parison P, a pair of molds 30 which are symmetrically arranged along the longitudinal axis of the parison P and which are provided so as to be contact with and depart from each other, and a blow pin (not shown) which is driven by a predetermined driving device to blow compressed air into the parison P during the blow molding process.

As shown in FIG. 1, the accumulator head 20 includes: a main body 21 on a hollow cylinder (hereinafter referred to as "head main body"); a center shaft 22 provided along the center axis of the head main body 21 in the up-and-down direction; a core 23 fixed to the lower end side of the center shaft 22; and a die 24 which is provided at the lower end part of the head main body 21 and which is provided at the outer periphery part of the core 23. By moving the center shaft 22 up and down, the position of the core 23 in the up and down direction is changed with respect to the die 24 to adjust the distance between the core 23 and the die 24. Therefore, it is possible to appropriately adjust the thickness of the parison P.

In the head main body 21 of the accumulator head 20, an extrusion cylinder 25 for extruding the liquid crystal resin composition toward an extrusion opening 21a formed by the core 23 and the die 24 after storing the supplied liquid crystal resin composition once, is formed. A driving device 26 of the oil pressure type is attached to a piston 25a of the extrusion cylinder 25.

Figure 2:
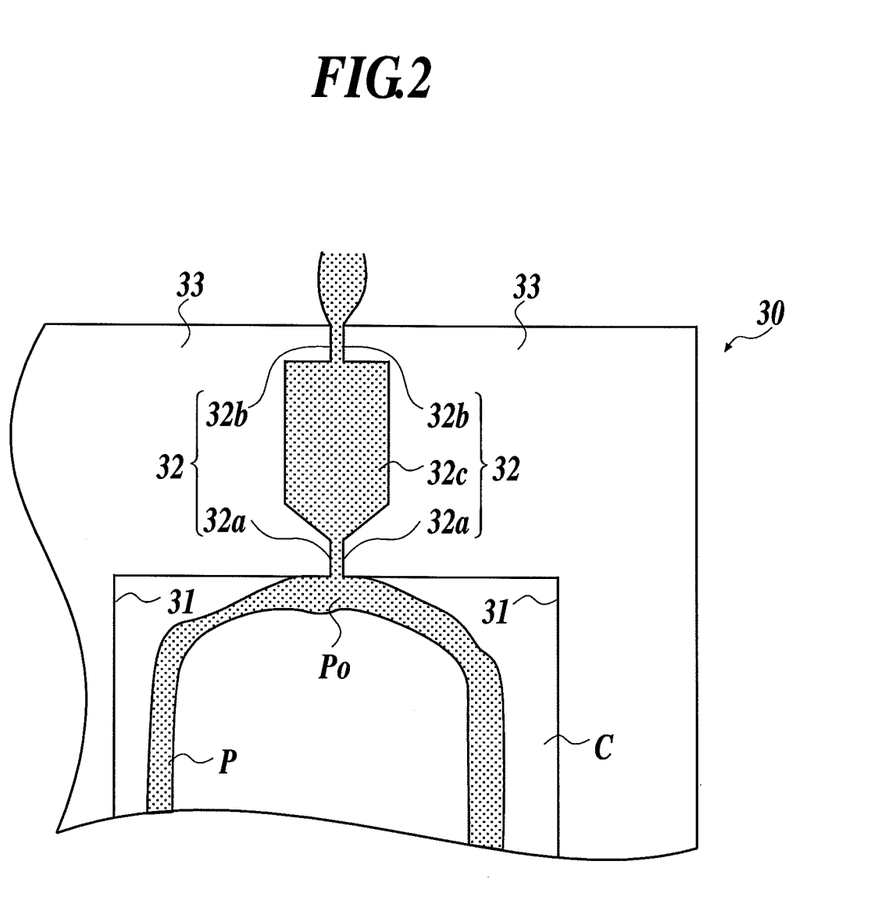
FIG. 2 This is an enlarged view of a two-stage pinch section (section II) of a mold of the blow molding machine shown in FIG. 1.

As shown in FIG. 1 and FIG. 2, each of the left and right molds 30 includes a molding face 31 for forming a cylindrical cavity C when the molds are closed, and two-stage pinch sections 32 for cutting the upper and lower end portions of the parison P. The cavity C formed by the left and right molding faces 31 has the same shape as the outer shape of a pressure-resistant container liner to be manufactured. The left and right molds 30 are driven to open and close by an open/close driving device (not shown).

The two-stage pinch sections 32 of the molds 30 are provided at end portions of upper and lower wall faces 33 provided perpendicularly to the longitudinal axis of the parison. As shown in FIG. 2, the two-stage pinch sections 32 comprise the first pinch 32a at the inner side (cavity C side) and the second pinch 32b at the outer side. Thus, when the molds 30 are closed, a space 32c sandwiched by the first pinch 32a and the second pinch 32b is formed in the intermediate section of the end portions of the wall faces 33 in the up and down direction. The space 32c functions as a "resin storage" when the molds 30 are closed and a parison P is cut off by the two-stage pinch sections 32. The liquid crystal resin composition is prevented from flowing from the pinch-off section of the parison P to the outside.

As shown in FIG. 1, a material supply device 50 for supplying the liquid crystal resin composition into the accumulator head 20 via a connection block 40, is connected to the upper side face of the accumulator head 20 of the blow molding machine 10. The material supply device 50 includes: a cylindrical cylinder main body 51; a screw 52 rotatably contained in the cylinder main body 51; and a hopper 53 for putting pellets Pt as molding material into the cylinder main body 51.

The operation of each of the above-described driving devices of the blow molding machine 10 (e.g., the driving device 26 for driving the extrusion cylinder 25 of the accumulator head 20, the open/close driving device of the mold 30, the driving device of the blow pin) is controlled and the operation of the screw 52 of the material supply device 50 is controlled by a control device (not shown). On the outer periphery side of the mold 30 and the outer periphery side of the cylinder main body 51 of the material supply device 50, heaters (not shown) for heating the interior of the molds 30 and that of the cylinder main body 51 to a predetermined temperature, are provided.

Next, the method for manufacturing the pressure-resistant container liner by a blow molding by using the liquid crystal resin composition and the blow molding machine 10 and the like, will be explained. The pressure-resistant container liner manufactured by the manufacture method according to this embodiment is a liquid crystal resin liner according to the present invention.

First, the pellets Pt of the above liquid crystal resin composition, which are provided in pellet-like shape are put into the hopper 53 of the material supply device 50 shown in FIG. 1. By rotating the screw 52 at a predetermined rotation rate and by heating the cylinder main body 51 using the heaters, the pellets Pt are heated and melt in the cylinder main body 51 (resin composition melting step).

The heating temperature in the resin composition melting step is required to be equal to or higher than the melting point of the liquid crystal resin according to the present invention (270 to 370° C.) and is required to be equal to or lower than a temperature of the melting point +40° C. (preferably a temperature range from the melting point to the melting point +30° C.). In order to improve the drawdown resistance property of the liquid crystal resin composition, the heating temperature is desirably lowered. In consideration with the stretchability during the melting required for the blowup, the heating temperature is required to be equal to or higher than the melting point. There is a difference in the molding processability between not less than the melting point and lower than the melting point. Although the composition can be processed at a heating temperature lower than the melting point, the melt stretchability (tensile breaking elongation) of the composition is deteriorated. Therefore, the superior property of the liquid crystal resin composition cannot be used. On the other hand, when the heating temperature exceeds the melting point +40° C., the drawdown resistance property is deteriorated and the above heating temperature is not preferred.

Next, in an initial status in which the piston 25a of the extrusion cylinder 25 of the blow molding machine 10 is maintained at a predetermined elevated position, the melt liquid crystal resin as resin material to be molded is supplied from the material supply device 50 into the head main body 21 (extrusion cylinder 25) of the accumulator head 20. Then, when this liquid crystal resin composition is supplied in the predetermined amount, the driving device 26 is operated to lower the piston 25a of the extrusion cylinder 25. Therefore, the liquid crystal resin composition filled in the extrusion cylinder 25 is sent through the circular gap formed between the core 23 and the die 24 to extrude the composition through the extrusion opening 21a and the cylindrical parison P is formed (parison forming step).

When the cylindrical parison P is extruded through the extrusion opening 21a, the extraction amount of the liquid crystal resin composition is set to be equal to or higher than 0.3 kg and lower than 5 kg per minute (the extrusion speed is equal to or higher than 0.3 kg/minute and lower than 5 kg/minute) or is set to be equal to or higher than 2.0 kg and lower than 5 kg per minute because the tensile breaking elongation of the pinch-off section is more preferred. Alternatively, the shear rate of the liquid crystal resin composition at the extrusion opening 21a is set to be equal to or higher than 50/second and lower than 1000/second or is set to be equal to or higher than 300/second and lower than 1000/second because the tensile breaking elongation of the pinch-off section is more preferred. When the extrusion speed of the liquid crystal resin composition is lower than 0.3 kg/minute or a shear rate is lower than 50/second, the parison P is cooled and the adhesiveness of the pinch-off section is deteriorated in a blow molding step (which will be described after). Therefore, a preferable molded product cannot be obtained. On the other hand, when the extrusion speed of the liquid crystal resin composition is equal to or higher than 5 kg/minute or the shear rate is equal to or higher than 1000/second, the erecting property of the parison P is deteriorated. It is difficult to obtain the molded products having a uniform thickness and the tensile breaking elongation of the parison P in a direction perpendicular to the longitudinal axis direction is deteriorated. Therefore, a preferable molded product cannot be obtained.

Even though a die for extruding a parison has any structure, it is possible to form a molded product. However, the die having a structure for suppressing a spider mark or a weld line is preferred because molded products having high uniform thickness property are easily obtained. Generally, a die head has a cross head die structure because the die head vertically changes the flow of resin outputted through a horizontal extruder. A cross head die is classified into the center inflow type one and the side inflow type one. In the center inflow type one, because a spider for retaining a mandrel is provided, it is difficult to eliminate a spider mark. On the other hand, in the side inflow type one, there is no spider. However, a weld line is caused at a part at which the resin flows collectively. Because the weld line can be less conspicuous by providing a spiral flow path in the mandrel of the side inflow type die, this structure is preferable. When an accumulator is used, the above die is directly used in case of a side accumulator. Thus, a spiral mandrel is suitable for the molding of the pressure-resistant container liner of the present invention. The weld line also can be less conspicuous by using an accumulator in a die (ring piston type accumulator) as shown in FIG. 1.

Next, as shown in FIG. 1, the molds 30 are closed by driving the open/close driving device in a state that the parison P is disposed between the left and right molds 30 (mold closing step). In this embodiment, a ratio of the diameter of the parison P formed by the parison forming step to the diameter of the cavity C (see FIG. 2) formed with the left and right molding faces 31 by closing the mold 30 (blow ratio) is set to 2.0 to 8.0. By setting the blow ratio within such a range, the anisotropic nature in the longitudinal axis direction of the parison P and the anisotropic nature in a direction perpendicular to this longitudinal axis direction can be further improved.

The blow ratio which is lower than 2.0 is not preferred because the parison P is little elongated in a direction perpendicular to the longitudinal axis direction and the parison P easily deforms. On the other hand, When the blow ratio exceeds 8.0, the parison P is significantly elongated in a direction perpendicular to the longitudinal axis direction of the parison P and the tensile breakage strength of the parison P is increased. However, because the tensile breaking elongation becomes small and the parison P easily breaks when the pressure in the liner increases, the above blow ratio is not preferred. The blow ratio which is set to the range of 2.0 to 6.0 is preferable because the anisotropic nature can be further improved.

In this embodiment, the mold 30 is heated by the heaters in the mold closing step in a temperature range from 40 to 150° C. By heating the mold 30 in the mold closing within the above temperature range, the adhesiveness of the pinch-off section Po (see FIG. 2) of the parison P can be improved. The temperature of the mold 30, which is lower than 40° C. is not preferred because the parison P is cooled when the parison is in contact with the mold 30 and the adhesive strength of the pinch-off section Po is decreased. On the other hand, when the temperature of the mold 30 exceeds 150° C., the cooling speed of the parison P is slow and the parison is thinly elongated by blowup. Therefore, the strength of the pinch-off section Po is decreased and the above temperature is not preferred.

As the shape of the pinch section of the mold 30, the two-stage pinch section 32 as in this embodiment (see FIG. 2) is more preferable than a general one-stage pinch section because it is possible to increase the thickness of the pinch-off section Po of the parison P. The reason is that a space formed by the two-stage pinch section 32 functions as a "resin storage" to prevent resin from flowing from the pinch-off section Po of the parison P to the outside. For example, the thickness of the pinch-off section Po of 2 mm or more (more preferably 3 mm or more) is preferable because the adhesiveness of the pinch-off section Po is increased and the high tensile breaking elongation is obtained.

When the thickness of the pinch-off section Po is increased, a mold closing pressure is small and the adhesive force for adhering the parisons P is weak. Thus, the tensile breakage strength and the tensile breaking elongation of the pinch-off section Po are reduced. Therefore, it is important to set the mold closing pressure to an appropriate value depending on the thickness of the pinch-off section Po. Specifically, a value obtained by dividing the mold closing pressure by the thickness of the pinch-off section Po is suitably set to be equal to or higher than 3.5 MPa/cm and more preferably equal to or higher than 4.0 MPa/cm.

Next, by blowing compressed air from a blow pin (not shown) into the parison P, the parison P is pressed to the molding face 31 of the mold 30 and is cooled to mold a pressure-resistant container liner as a molded product (blow molding step). Compressed air is preferably blown at the timing at which 0.5 to 1.5 seconds elapse since the mold is closed. Thereafter, when the mold 30 is cooled to a predetermined temperature, the mold 30 is opened by driving the open/close driving device to take a molded product (pressure-resistant container liner). Then, the manufacturing of the liner is finished.

EXAMPLE

Next, the present invention will be described in further detail by the examples. In these examples, three types of whole aromatic liquid crystal resins are manufactured and each of these three types of liquid crystal resins is mixed with epoxy modified polyolefin-base resin to prepare various resin composition pellets. Then, these resin composition pellets are heated and melt at various temperatures to carry out the blow molding. Then, the properties of the obtained blow-molded products are evaluated.

The property evaluation method which is carried out in these examples, is as follows.

(1) Melting point of liquid crystal resin: Based on JIS K7121, the obtained liquid crystal resin pellets were measured at the temperature increase rate of 20° C./minute by the differential thermal analysis (DSC).

(2) Melt viscosity: By a capillary leometer (capilograph 1B made by Toyo Seiki Co., Ltd. and having a barrel diameter of 10 mm), apparent melt viscosities were measured at a shear rate of 1000/second based on ISO11443. In the measurement, an orifice having an inner diameter of 1.0 mm and a length of 20 mm was used.

(3) Melt tension: In the above capillary leometer, the tensions (mN) applied to fibers of the melt polymer when the melt polymer discharged from the orifice was taken over in a fibrous manner at take-over speeds of 14.8 m/minute and 29.6 m/minute, were measured under the conditions of the temperature T1 (resin melting point +20° C.) and a piston extrusion speed of 10 mm/minute by the orifice having an inner diameter of 1.0 mm and a length of 20 mm.

(4) Appearance of molded product (breakage of molded product): By a blow molding machine (S-45ND made by Placo Co., Ltd.), cylindrical blow-molded products having a diameter of 120 mm and a length of 280 mm were prepared at the molding temperatures shown in Tables 3 and 4. Then, it was visually evaluated whether the molded products were broken or not after the blow process.

(5) Tensile breaking elongation: From a trunk section of the blow-molded product, a test piece was cut out in a dumbbell piece shape based on ASTM D638 type 5 and the tensile breaking elongations were measured in the parison longitudinal axis direction (hereinafter referred to as "vertical direction") and in a direction perpendicular to this parison longitudinal axis direction (hereinafter referred to as "horizontal direction") by using Tensilon RTC-1325A made by ORIENTEC Co., LTD.

(6) Pinch-off section tensile breaking elongation: In order to measure the tensile breaking elongation of a cutting line at the pinch-off section of the blow-molded product, the test piece was cut out in a dumbbell piece shape based on ASTM D638 type 5 in a direction perpendicular to the cutting line. Then, the tensile breaking elongation of the pinch-off section was measured by Tensilon RTC-1325A made by ORIENTEC Co., LTD.

(7) Thickness of pinch-off section: the thickness of the cutting line portion of the test piece which was used for the measurement of the tensile breaking elongation of the pinch-off section was measured.

(8) Uniform thickness property of molded product: A middle part of the trunk section of the molded product in the up-and-down direction was cut out in a stripe-like shape. Then, the maximum and minimum values of the thickness were measured and the ratio between the maximum and minimum values was used as an evaluation value of the uniform thickness property.

First, the manufacture examples of three types of whole aromatic liquid crystal resins (which will be called as LCP-A, LCP-X, and LCP-Y) will be explained.

Manufacture Example 1

Manufacture of LCP-A 173 weight parts of P-hydroxy benzoic acid, 38 weight parts of 6-hydroxy-2-naphthoic acid, 52 weight parts of 4,4'-dihydroxy biphenyl, 65 weight parts of terephthalic acid, 17 weight parts of 4-acetaminophenol, 0.04 weight part of potassium acetate, and 221 weight parts of acetic anhydride were respectively put into reactors including agitators and distillation tubes. After the nitrogen substitution was sufficiently carried out, the temperature was increased to 150° C. under normal pressures and the agitation was started. The agitation was carried out at 150° C. for 30 minutes. Then, the temperature was gradually increased to distil away acetic acid as by-product material. When the temperature reached 340° C., the pressure in the reactor was gradually decreased and the agitation was carried out under a pressure of 5 torr for one hour. When a target agitation torque was reached, a discharge opening of the lower part of the reactor was opened and the resin was taken out in a strand shape by nitrogen pressure. The discharged strands were processed by a pelletizer to obtain powders. The melting point of this whole aromatic polyesteramide liquid crystal resin (LCP-A) was 300° C. and the melt viscosity was 36.8 Pa·s at 320° C.

Manufacture Example 2

Manufacture of LCP-X 345 weight parts of P-hydroxy benzoic acid, 175 weight parts of 6-hydroxy-2-naphthoic acid, 0.02 weight part of potassium acetate and 350 weight parts of acetic anhydride were respectively put into reactors including agitators and distillation tubes. After the nitrogen substitution was sufficiently carried out, the temperature was increased to 150° C. under normal pressures and the agitation was started. The agitation was carried out at 150° C. for 30 minutes. Then, the temperature was gradually increased to distil away acetic acid as by-product material. When the temperature reached 300° C., the pressure in the reactor was gradually decreased and the agitation was carried out under a pressure of 5 torr for one hour. When a target agitation torque was reached, a discharge opening of the lower part of the reactor was opened and the resin was taken out in a strand shape by nitrogen pressure. The discharged strands were processed by a pelletizer to obtain powders. The melting point of this whole aromatic polyesteramide liquid crystal resin (LCP-X) was 280° C. and the melt viscosity was 50.1 Pa·s at 300° C.

Manufacture Example 3

Manufacture of LCP-Y 252 weight parts of P-hydroxy benzoic acid, 87 weight parts of 6-hydroxy-2-naphthoic acid, 3 weight parts of terephthalic acid, 0.02 weight part of potassium acetate, and 350 weight parts of acetic anhydride were respectively put into reactors including agitators and distillation tubes. After the nitrogen substitution was sufficiently carried out, the temperature was increased to 150° C. under normal pressures and the agitation was started. The agitation was carried out at 150° C. for 30 minutes. Then, the temperature was gradually increased to distil away acetic acid as by-product material. When the temperature reached 350° C., the pressure in the reactor was gradually decreased and the agitation was carried out under a pressure of 5 torr for one hour. When a target agitation torque was reached, a discharge opening of the lower part of the reactor was opened and the resin was taken out in a strand shape by nitrogen pressure. The discharged strands were processed by a pelletizer to obtain powders. The melting point of this whole aromatic polyesteramide liquid crystal resin (LCP-Y) was 325° C. and the melt viscosity was 40.3 Pa·s at 345° C.

Compositions of these LCP-A, X, and Y are shown in Table 1. Any of LCP-A, X, and Y showed an optically anisotropic nature in a melt status.

TABLE 1

| Example | LCP | Ratio of repeating polymerization units (mol %) | | | | |
|---|---|---|---|---|---|---|
| | | I | II | III | IV | V |
| Manufacture example 1 | A | 9 | 56 | 12.5 | 5 | 17.5 |
| Manufacture example 2 | X | 27 | 73 | — | — | — |
| Manufacture example 3 | Y | 20 | 79.3 | — | — | 0.7 |

Next, LCP-A, X, and Y manufactured as described above were dry-blended with epoxy modified polyolefin-base resin (Bondofast E made by Sumitomo Chemical Co., Ltd., ethylene glycidyl methacrylate (GMA) copolymer including GMA of 12 weight % and MFR of 3) at ratios shown in Table 2. Then, by using a twin-screw extruder (Tex30α made by Japan Steel Works, Ltd.), the resins were melt and kneaded at a cylinder temperature (320° C. for LCP-A, 300° C. for LCP-X, and 345° C. for LCP-Y), a throughput rate of 30 kg/hr, and a screw rotation rate of 200 rpm to provide pellets. Then, the "examples 1 to 7" and "comparison examples 1 to 6" were prepared by a blow molding under conditions shown in Table 3 and 4. The obtained liquid crystal resin pellets and blow-molded products were evaluated with regards to the properties of the above items (1) to (8). The evaluation result is shown in Tables 3 and Table 4.

TABLE 2

| | LCP | | Polyolefin-base resin (weight %) B |
|---|---|---|---|
| Examples | Type | Mixing quantity (weight %) | |
| Example 1 | A | 95 | 5 |
| Example 2 | A | 90 | 10 |
| Examples 4 to 7 | | | |
| Comparison examples 4 to 6 | | | |
| Example 3 | A | 85 | 15 |
| Comparison example 1 | X | 90 | 10 |
| Comparison example 2 | Y | 90 | 10 |
| Comparison example 3 | A | 100 | |

TABLE 3

| | Examples | | Example 1 | Example 2 | Example 3 | Example 4 | Example 5 | Example 6 | Example 7 |
|---|---|---|---|---|---|---|---|---|---|
| Component | LCP | A | 95 | 90 | 85 | 90 | 90 | 90 | 90 |
| | | X | | | | | | | |
| | | Y | | | | | | | |
| | Polyolefin-base resin B | Bondfast E | 5 | 10 | 15 | 10 | 10 | 10 | 10 |
| Manufactured resin | Melting point | ° C. | 300 | 300 | 300 | 300 | 300 | 300 | 300 |
| | Melt viscosity | Pa·s | 119.4 | 299 | 312.5 | 299 | 299 | 299 | 299 |
| | Melt tension at 14.8 m/minute | mN | 53.2 | 134.9 | 102.0 | 134.9 | 134.9 | 134.9 | 134.9 |
| | Melt tension at 29.6 m/minute | mN | 60.3 | 166.1 | 122.5 | 166.1 | 166.1 | 166.1 | 166.1 |
| | Increase rate of melt tension | | 1.13 | 1.23 | 1.20 | 1.23 | 1.23 | 1.23 | 1.23 |
| Blow molding | Temperature | ° C. | 320 | 320 | 320 | 320 | 320 | 320 | 320 |
| | Blow ratio | | 2.4 | 2.4 | 2.4 | 2.4 | 2.0 | 2.4 | 2.4 |
| | Mold temperature | ° C. | 80 | 80 | 80 | 80 | 80 | 80 | 80 |
| | Die/mandrel shape | | Crosshead/spiral | ← | ← | ← | Spider type | Crosshead/spiral | ← |
| | Pinch section shape | | 2-stage | 2-stage | 2-stage | 2-stage | 2-stage | 2-stage | 1-stage |
| | mold closing pressure | kgf/cm² | 19 | 19 | 19 | 19 | 19 | 11 | 11 |
| | Extrusion speed | kg/min | 3 | 3 | 3 | 1.8 | 3 | 3 | 3 |

TABLE 3-continued

| | Examples | | Example 1 | Example 2 | Example 3 | Example 4 | Example 5 | Example 6 | Example 7 |
|---|---|---|---|---|---|---|---|---|---|
| | Shear rate | sec$^{-1}$ | 400 | 400 | 400 | 240 | 400 | 400 | 400 |
| | Breakage of molded product | | No | No | No | No | No | No | No |
| Tensile test | Elongation in vertical direction (MD) | % | 8.2 | 11.8 | 18.8 | 12.6 | 8.3 | 8.3 | 8.3 |
| | Elongation in horizontal direction (TD) | % | 11.3 | 17.4 | 26.6 | 14.7 | 18.2 | 18.2 | 18.2 |
| | MD/TD | | 0.73 | 0.68 | 0.71 | 0.86 | 0.46 | 0.46 | 0.46 |
| Thickness of pinch-off section | | mm | 3.01 | 3.22 | 3.34 | 3.06 | 3.06 | 3.24 | 1.79 |
| Tensile breaking elongation of pinch-off section | | % | 8.7 | 10.4 | 12.5 | 6.7 | 10 | 7.2 | 5.3 |
| Thickness of pinch-off section at mold closing pressure | | MPa/cm | 6.3 | 5.9 | 5.7 | 6.2 | 6.2 | 3.4 | 6.1 |
| Minimum value of trunk section of molded product | | mm | 1.0 | 1.1 | 1.0 | 1.0 | 0.3 | 1.1 | 1.0 |
| Maximum value of trunk section of molded product | | mm | 1.2 | 1.3 | 1.3 | 1.3 | 1.4 | 1.3 | 1.2 |
| Uniform thickness property of molded products | | | 1.2 | 1.2 | 1.3 | 1.3 | 4.7 | 1.2 | 1.2 |

TABLE 4

| | Examples | | Comparison Example 1 | Comparison Example 2 | Comparison Example 3 | Comparison Example 4 | Comparison Example 5 | Comparison Example 6 |
|---|---|---|---|---|---|---|---|---|
| Component | LCP | A | | | | 100 | 90 | 90 | 90 |
| | | X | 90 | | | | | | |
| | | Y | | 90 | | | | | |
| | Polyolefin-base resin B | Bondfast E | 10 | 10 | | 10 | 10 | 10 |
| Manufactured resin | Melting point | °C. | 280 | 325 | 300 | 300 | 300 | 300 |
| | Melt viscosity | Pa·s | 285.6 | 188.5 | 36.8 | 299 | 299 | 299 |
| | Melt tension at 14.8 m/minute | mN | 141.1 | 91.2 | Unmeasurable | 134.9 | 134.9 | 134.9 |
| | Melt tension at 29.6 m/minute | mN | 140.8 | 92.1 | — | 166.1 | 166.1 | 166.1 |
| | Increase rate of melt tension | | 1.00 | 1.01 | — | 1.23 | 1.23 | 1.23 |
| Blow molding | Temperature | °C. | 300 | 345 | 320 | 320 | 320 | 360 |
| | Blow ratio | | 2.4 | 2.4 | Draw down | 2.4 | 2.4 | 2.4 |
| | Mold temperature | °C. | 80 | 80 | Unmoldable | 80 | 80 | 80 |
| | Die/mandrel shape | | Crosshead/spiral | ← | ← | ← | ← | ← |
| | Pinch section shape | | 2-stage | 2-stage | | 2-stage | 2-stage | 2-stage |
| | mold closing pressure | kgf/cm$^2$ | 19 | 19 | | 19 | 19 | 19 |
| | Extrusion speed | kg/min | 3 | 3 | | 0.15 | 9 | 3 |
| | Shear rate | sec$^{-1}$ | 400 | 400 | | 30 | 1200 | 400 |
| | Breakage of molded product | | No | Yes | | No | Yes | No |
| Tensile test | Elongation in vertical direction (MD) | % | 6.2 | Unmeasurable | | 10.6 | Unmeasurable | 7.4 |
| | Elongation in horizontal direction (TD) | % | 10.1 | Unmeasurable | | 15.2 | Unmeasurable | 10.3 |
| | MD/TD | | 0.61 | Unmeasurable | | 0.70 | Unmeasurable | 0.68 |
| Thickness of pinch-off section | | mm | 0.2 | | | 4.2 | | 1.1 |
| Tensile breaking elongation of pinch-off section | | % | <0.2 | | | 0.6 | | 0.9 |
| Thickness of pinch-off section at mold closing pressure | | MPa/cm | 95.0 | | | 4.5 | | 17.3 |
| Minimum value of trunk section of molded product | | mm | 0.4 | 0 | | 0.5 | 0 | 0.6 |
| Maximum value of trunk section of molded product | | mm | 1.1 | 2.5 | | 1.8 | 2.1 | 0.9 |

TABLE 4-continued

| Examples | Comparison Example 1 | Comparison Example 2 | Comparison Example 3 | Comparison Example 4 | Comparison Example 5 | Comparison Example 6 |
|---|---|---|---|---|---|---|
| Uniform thickness property of molded products | 2.8 | — | | 3.6 | — | 1.5 |

Examples 1 to 7

The pellets obtained by the examples 1 to 7 showed a melt tension increase rate of 1.05 or more, which was suitable for a blow molding process.

As shown in Table 3, the blow-molded products obtained by the examples 1 to 7 showed that the tensile breaking elongations of the trunk section in the vertical direction and the horizontal direction significantly were higher than a criterion of "2% or more". In the examples 2, 3, and 4, the tensile breaking elongations in the vertical direction and the horizontal direction exceeded 10%.

The blow-molded products obtained by the examples 1 to 7 showed that the tensile breaking elongation of the pinch-off section significantly was higher than a criterion of "1% or more" and that the tensile breaking elongation exceeded the property required for a pressure-resistant container liner. In the examples 2 and 3, the tensile breaking elongation of the pinch-off section exceeded 10%.

The thicknesses of the pinch-off sections of the all blow-molded products obtained by examples 1 to 6 were "2 mm or more" and exceeded 3 mm.

In the blow-molded products obtained by the examples 1 to 7, the thicknesses and uniform thickness properties were preferable. However, in the example 5 using a spider-type head, the maximum thickness was 1.4 mm and the minimum thickness was 0.3 mm. The uniform thickness property was deteriorated.

In the example 7, because the "one-stage" pinch section was used as a shape of the pinch section of the mold, the thickness of the pinch-off section of the obtained blow-molded product was relatively thin. However, the tensile breaking elongation of the pinch-off section was "1% or more" and satisfied the property required for a pressure-resistant container liner. Therefore, there is no problem (see Table 3).

In the example 6, a value obtained by dividing the mold closing pressure by the thickness of the pinch-off section was 3.4 MPa/cm which was relatively small. Thus, the adhesive force for adhering parisons was relatively small. However, the tensile breaking elongation of the pinch-off section of the obtained blow-molded product was "1% or more" and satisfied the property required for a pressure-resistant container liner. Therefore, there is no problem (see Table 3).

Comparison Examples 1 to 6

The pellet obtained by the comparison example 1 does not have the required components (not including (III) aromatic diol residue, (IV) 4-aminophenol residue and (V) aromatic dicarboxylic acid residue). Because the increase rate of the melt tension was lower than 1.05, it was difficult to carry out the blow molding process. The thickness of the pinch-off section and the tensile breaking elongation of the pinch-off section were remarkably deteriorated, and the properties required for a pressure-resistant container liner were not satisfied.

The pellet obtained by the comparison example 2 does not have the required components (not including (III) aromatic diol residue and (IV) 4-aminophenol residue). Because the increase rate of the melt tension was lower than 1.05, it was difficult to carry out the blow molding process. Further, the cracks were caused in a blow-molded product.

In the pellet obtained by the comparison example 3, the melt viscosity was low and the drawdown resistance property was insufficient. Therefore, the molding could not be carried out.

In the comparison example 4, because the extrusion speed of the resin was lower than 0.3 kg/minute (0.15 kg/minute) and the shear rate was lower than 50/second (30/second), the parison was cooled and the tensile breaking elongation of the pinch-off section of the obtained blow-molded product was lower than 1% (0.6%). Therefore, the properties required for a pressure-resistant container liner were not satisfied.

In the comparison example 5, because the extrusion speed of the resin was not less than 5 kg/minute (9 kg/minute) and the shear rate was not less than 1000/second (1200/second), the erecting property of the parison was deteriorated. Further, the cracks were caused in a blow-molded product.

In the comparison example 6, the melt temperature of the resin was set to be higher than the melting point +40° C. (340° C.) of the resin (360° C.). Thus, the drawdown resistance property of the parison was deteriorated, and the tensile breaking elongation of the pinch-off section of the obtained blow-molded product was lower than 1% (0.9%). Therefore, the properties required for a pressure-resistant container liner were not satisfied.

In the manufacture methods according to the embodiment as described above, the whole aromatic polyestermide liquid crystal resin composition having a specific composition is mixed with the epoxy modified polyolefin-base resin to generate a liquid crystal resin composition having a specific melt property by melting and kneading them. The liquid crystal resin composition is heated and melted at a specific temperature and a cylindrical parison is extruded at a specific extrusion speed or a shear rate to perform a blow molding. Thus, it can be achieved that the tensile breaking elongation is "2% or more" in the vertical direction and in the horizontal direction of the trunk section of the blow-molded product (liner) and it can be achieved that the tensile breaking elongation is "1% or more" in the pinch-off section (examples 1 to 7: See Table 3). Furthermore, by using the property of the liquid crystal resin, a liner having a superior gas barrier property can be obtained.

Furthermore, in the manufacture method according to the above-described embodiment, the resin composition has the melt tension at a twice take-over speed (29.6 m/minute), which is 1.05 or more times larger than the melt tension at a take-over speed of 14.8 m/minute. Thus, high-quality liners in which the blow molding can be easily carried out can be manufactured at a high yield.

Furthermore, in the manufacture method according to the above-described embodiment, a ratio of the outer diameter of the parison formed in the parison forming step to the diameter of a cavity formed by a mold (blow ratio) is set to a specific ratio (2.0 to 8.0). Thus, the anisotropic nature of the liquid crystal resin can be improved and the tensile breaking elongations in both of the vertical direction and the horizontal direction of the trunk section of the blow-molded product (liner) can be improved (the examples 1 to 7: see Table 3).

Furthermore, in the manufacture method according to the above-described embodiment, when the mold closing step is performed, the mold is heated in a specific temperature range (40° C. to 150° C.). Thus, the adhesiveness of the liquid crystal resin at the pinch-off section of the blow-molded product (liner) can be improved. Further, the tensile breaking elongation of the pinch-off section can be improved (examples 1 to 7: see Table 3).

Furthermore, in the manufacture method according to the above-described embodiment, when the mold closing step is performed, the value obtained by dividing the mold closing pressure by the thickness of the pinch-off section is equal to or higher than a specific threshold value (3.5 MPa/cm). Thus, the adhesiveness of the liquid crystal resin at the pinch-off section can be improved. Further, the tensile breaking elongation of the pinch-off section can be improved (the examples 1 to 7: see Table 3).

Furthermore, in the manufacture method according to the above-described embodiments, two-stage pinch sections are provided in the molds and a space is formed between the two-stage pinch sections when the molds are closed in the mold closing step. Thus, when the parison is cut off in the mold closing step, the liquid crystal resin can be stored in the space formed between the two-stage pinch sections. Therefore, when the mold closing is carried out, it can be prevented that the liquid crystal resin flows out of the pinch-off section of the blow-molded product (liner) to the outside of the mold. It can be prevented that the pinch-off section is thinner. As a result, it is possible to increase the adhesiveness of the pinch-off section and to improve the tensile breaking elongation of the pinch-off section (examples 1 to 7: see Table 3).

Furthermore, in the blow-molded product (liquid crystal resin liner) manufactured by the examples 1 to 7, the tensile breaking elongation of the trunk section is "2% or more" and the tensile breaking elongation of the pinch-off section is "1% or more". Thus, the properties required for the trunk section and the pinch-off section of the pressure-resistant container liner are satisfied. Because of the property of the liquid crystal resin, the superior gas barrier property is obtained. Thus, the liquid crystal resin liner can be suitably used as a pressure-resistant container liner instead of a high density polyethylene liner.

In the blow-molded product (liquid crystal resin liner) manufactured by the examples 1 to 6 as described above, the pinch-off section has a thickness of the specific threshold value (2 mm) or more. Thus, the adhesiveness of the pinch-off section is increased and the liner has a high tensile breaking elongation.

The entire disclosure of Japanese Patent Application No. 2005-117095, filed on Apr. 14, 2005, is incorporated herein by reference in their entirety.

INDUSTRIAL APPLICABILITY

The manufacture method of the present invention is useful for manufacturing a pressure-resistant container liner effectively using a superior gas barrier property of the liquid crystal resin by a blow molding. The obtained liquid crystal resin liner can be used for the liner of a fuel tank or the like of an automobile and a spacecraft, which is required to have lighter weight.

EXPLANATION OF REFERENCE NUMERALS

30 Mold
32 Two-stage pinch section
32c Space
C Cavity
P Parison
Po Pinch-off section

The invention claimed is:

1. A method for manufacturing a pressure-resistant container liner by a blow molding, comprising:
    a resin composition melting step of mixing 99 to 70 weight % of specific whole aromatic polyesteramide liquid crystal resin (A), the whole aromatic polyesteramide liquid crystal resin comprising repeating polymerization units of:
    (I) 1 to 15 mol % of 6-hydroxy-2-naphthoic acid residue,
    (II) 40 to 70 mol % of 4-hydroxy benzoic acid residue,
    (III) 5 to 28.5 mol % of aromatic diol residue,
    (IV) 1 to 20 mol % of 4-aminophenol residue, and
    (V) 6 to 29.5 mol % of aromatic dicarboxylic acid residue, with
    1 to 30 weight % of epoxy modified polyolefin-base resin (B), with a total of the whole aromatic polyesteramide liquid crystal resin (A) and epoxy modified polyolefin-base resin (B) being 100 weight % of the resin composition, to form a resin composition by melting and kneading the whole aromatic polyesteramide liquid crystal resin and epoxy modified polyolefin-base resin, and of heating and melting the resin composition within a temperature range of a melting point to the melting point +40° C., the resin composition having a melt viscosity of 60 to 4000 Pas at a shear rate of 1000/second at a temperature which is 20° C. higher than the melting point and having a melt tension of 20 mN or more at a take-over speed of 14.8 m/minute;
    a parison forming step of extruding and forming a cylindrical parison with an extrusion speed equal to or higher than 0.3 kg/minute and lower than 5 kg/minute by using the specific resin composition melt in the resin composition melting step;
    a mold closing step of placing the parison formed in the parison forming step between a pair of molds forming a cylindrical cavity and of closing the molds, the pair of molds each comprising half of a two-stage pinch section provided in a wall of each mold such that when the pair of molds are closed there is formed at least one two-stage pinch section, comprising two pinch sections and a space between the two pinch sections, within one wall of the closed pair of molds; and
    a forming step of blowing gas into the parison in the molds closed in the mold closing step to form a liner.

2. A method for manufacturing a pressure-resistant container liner by a blow molding, comprising:
    a resin composition melting step of mixing 99 to 70 weight % of specific whole aromatic polyesteramide liquid crystal resin (A), the whole aromatic polyesteramide liquid crystal resin comprising repeating polymerization units of:
    (I) 1 to 15 mol % of 6-hydroxy-2-naphthoic acid residue,
    (II) 40 to 70 mol % of 4-hydroxy benzoic acid residue,
    (III) 5 to 28.5 mol % of aromatic diol residue,
    (IV) 1 to 20 mol % of 4-aminophenol residue, and
    (V) 6 to 29.5 mol % of aromatic dicarboxylic acid residue, with
    1 to 30 weight % of epoxy modified polyolefin-base resin (B), with a total of the whole aromatic polyesteramide liquid crystal resin (A) and the epoxy modified polyolefin-base resin (B) being 100 weight % of the resin composition, to form a resin composition by melting and kneading the whole aromatic polyesteramide liquid crystal resin and epoxy modified polyolefin-base resin, and of heating and melting the resin composition within a temperature range of a melting point to the melting point +40° C., the resin composition having a melt viscosity of 60 to 4000 Pas at a shear rate of 1000/second at a temperature which is 20° C. higher than the melting point and having a melt tension of 20 mN or more at a take-over speed of 14.8 m/minute;

a parison forming step of extruding and forming a cylindrical parison with a shear rate equal to or higher than 50/second and lower than 1000/second by using the specific resin composition melt in the resin composition melting step;

a mold closing step of placing the parison formed in the parison forming step between a pair of molds forming a cylindrical cavity and of closing the molds, the pair of molds each comprising half of a two-stage pinch section provided in a wall of each mold such that when the pair of molds are closed there is formed at least one two-stage pinch section, comprising two pinch sections and a space between the two pinch sections, within one wall of the closed pair of molds; and a forming step of blowing gas into the parison in the molds closed in the mold closing step to form a liner.

3. The method for manufacturing the pressure-resistant container liner as claimed in claim 1 or 2, wherein:

a resin composition in which an increase rate of a melt tension at a twice take-over speed (29.6 m/minute) to the melt tension at the take-over speed of 14.8 m/minute is 1.05 or more, is used.

4. The method for manufacturing the pressure-resistant container liner as claimed in claim 1 or 2, wherein:

when the mold closing step is performed, a value obtained by dividing a mold closing pressure by a thickness of a pinch-off section is of 3.5 MPa/cm or more.

5. The method for manufacturing the pressure-resistant container liner as claimed in claim 1 or 2, further comprising:

forming the liner with a trunk section having a tensile breaking elongation in all directions of 2% or more, and with a pinch-off section having a tensile breaking elongation in all directions of 1% or more.

6. The method for manufacturing the pressure-resistant container liner as claimed in claim 5, further comprising:

forming the liner with a pinch-off section having a thickness of 2 mm or more.

7. A method for manufacturing a pressure-resistant container liner by a blow molding, comprising:

a resin composition melting step of mixing a resin that consists essentially of a whole aromatic polyesteramide liquid crystal resin (A), and an epoxy modified polyolefin-base resin (B), by mixing 99 to 70 weight % of the resin (A), with 1 to 30 weight % of the resin (B);

the resin (A) comprising repeating polymerization units of:
(I) 1 to 15 mol % of 6-hydroxy-2-naphthoic acid residue,
(II) 40 to 70 mol % of 4-hydroxy benzoic acid residue,
(III) 5 to 28.5 mol % of aromatic diol residue,
(IV) 1 to 20 mol % of 4-aminophenol residue, and
(V) 6 to 29.5 mol % of aromatic dicarboxylic acid residue, wherein the resin composition is formed by melting and kneading the resin (A) and resin (B), and heating and melting the resin composition within a temperature range from a melting point to the melting point +40° C., the resin composition having a melt viscosity of 60 to 4000 Pas at a shear rate of 1000/second at a temperature which is 20° C. higher than the melting point and having a melt tension of 20 mN or more at a take-over speed of 14.8 m/minute;

a parison forming step of extruding and forming a cylindrical parison, using the specific resin composition melt in the resin composition melting step, with either: an extrusion speed equal to or higher than 0.3 kg/minute and lower than 5 kg/minute, or a shear rate equal to or higher than 50/second and lower than 1000/second;

a mold closing step of placing the parison formed in the parison forming step between a pair of molds forming a cylindrical cavity and of closing the molds, the pair of molds each comprising half of a two-stage pinch section provided in a wall of each mold such that when the pair of molds are closed there is formed at least one two-stage pinch section, comprising two pinch sections and a space between the two inch sections within one wall of the closed pair of molds; and a forming step of blowing gas into the parison in the molds closed in the mold closing step to form a liner.

8. The method for manufacturing the pressure-resistant container liner as claimed in claim 1, 2 or 7, wherein:

the pair of molds each comprise two or more halves of a two-stage pinch section such that when the pair of molds are closed there is formed two or more two-stage pinch sections.

9. The method for manufacturing the pressure-resistant container liner as claimed in claim 1, 2 or 7, wherein:

the resin composition has a melt viscosity of 80 to 4000 Pas.

10. The method for manufacturing the pressure-resistant container liner as claimed in claim 9, wherein:

the resin composition has a melt viscosity of 299 to 4000 Pas.

* * * * *